(No Model.)

A. G. MOORE.
BICYCLE RIM.

No. 577,308.          Patented Feb. 16, 1897.

Witnesses.
Francis C. Stanwood
Geo. F. Wood

Inventor.
Alfred G. Moore.
By H. E. Lodge Atty.

UNITED STATES PATENT OFFICE.

ALFRED G. MOORE, OF MALDEN, MASSACHUSETTS.

BICYCLE-RIM.

SPECIFICATION forming part of Letters Patent No. 577,308, dated February 16, 1897.

Application filed March 8, 1895. Serial No. 541,034. (No model.)

*To all whom it may concern:*

Be it known that I, ALFRED G. MOORE, a citizen of the United States, residing at Malden, in the county of Middlesex and State of Massachusetts, have invented certain new and useful Improvements in Bicycle-Rims; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to rims for the wheels of vehicles, and is more especially applicable to wooden rims for bicycles, particularly that class composed of a series of strips or laminæ rigidly united to form an annular ring of any desired cross-section.

My invention relates to and is intended particularly for the above special class of rims, when fitted with clencher-tires. This style of tire is intended to be held in position about the rim by air-pressure; but since this class of tire, however, brings a transverse strain on the rim, should any extraordinary shock occur when the rim is under this tension, the air-pressure is transmitted to the rim. As a result the rim splits longitudinally and separates into halves. This accident is superinduced because the entire pressure necessary to hold the tire in position is exerted transversely against the edges of the rim, and, further, because the rim is somewhat weakened by being bored circumferentially in order to admit of the insertion of the spokes. The purpose of my invention is to improve the construction of this class of rims (laminated wooden rims) in order to prevent this splitting and to enable said rim to be fitted with clencher-tires equally with any other type and without any liability of this accident (splitting) taking place.

To carry out my invention I propose to insert or interpose in various ways between the laminæ or strips which compose the rim a reinforce in the shape of some tough homogeneous matted or felted substance made of paper-pulp stock, after the nature of vulcanized fiber, leatheroid, or other similar tough material, which will resist rupture equally in every direction and thus counteract the tendency of the wood to split, due to the fact that the fibers are all arranged or disposed in one and the same direction.

Figure 2:
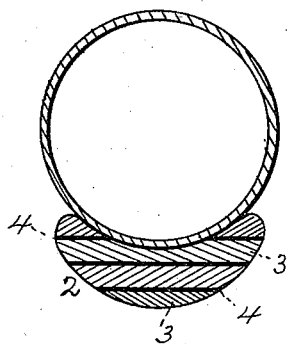
Figure 3:
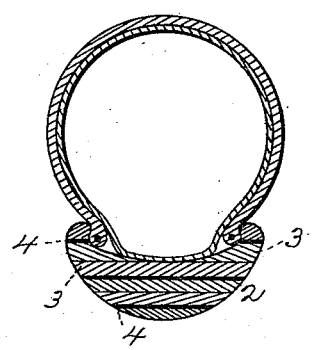
Figure 1:
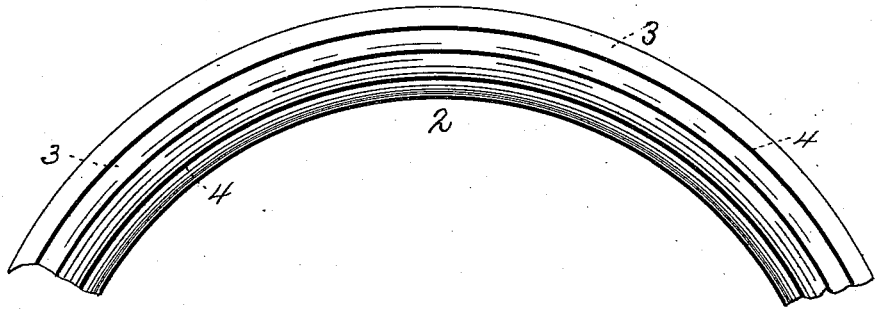

The drawings represent in Figure 1 a side elevation in part of a bicycle-rim embodying my invention, and where the reinforces are disposed alternately of the wooden strips. Fig. 2 is a similar section, where the reinforce is placed between each adjacent strip, while Fig. 3 shows a reinforce between every two strips.

In said drawings, 2 represents a rim of the class above premised as an entirety, and composed, primarily, of several concentric strips or laminæ of wood 3, bent into annular shape and firmly fastened together by means of some adhesive substance. Since these various strips are bent in the direction of the length of the fibers which compose them, it is evident that the fibers superposed in the several strips all lie in the same direction or all are in parallelism. As a consequence there is nothing to prevent said fibers separating in the direction of their length, and thus causing a circumferential split or crack which may extend in part or all the way around the rim. This tendency to crack or split longitudinally is aggravated if "clencher-tires," so called, are fitted about the rim, for the reason that these tires are held on by air-pressure which is exerted transversely of the edges of the rim. To obviate this difficulty, I propose to employ strips of reinforcing material, which is to be flexible and may be made of rawhide, leather, or preferably from some one of the numerous products obtained by the use of wood or paper pulp stock in the shape of leather-board, vulcanized fiber, or analogous material matted or felted together. This peculiar formation results in a tough homogeneous substance which has no regular grain or fiber, and hence will resist rupture or strains equally in any direction. These reinforce-strips 4 (indicated by the heavy black lines in the drawings) are to be cut of the same length and width as the wooden strips and are interposed as circumstances require. I do not desire to be limited, however, to any precise arrangement of said reinforce-strips, as the rim may be made up according to the character of the wood employed or the discretion of the manufacturer.

After the application of the adhesive compound said reinforce-strips are placed between the laminæ which comprise the rim and pressure then applied. The rim is allowed to set, after which it is turned down to the required shape in cross-section. The adhesive compound striking into the reinforce-strips naturally stiffens them, and because of the peculiar matted nature of said material, which is adapted to resist rupture equally well in any direction, the rim is greatly strengthened in its weakest places. In Figs. 1 and 2 the reinforce-strips alternate with the wooden strips, while in Fig. 3 they are disposed between every other strip of wood. These reinforce-strips not only add great strength to the rim transversely and prevent splitting, but they tend to prevent the rim from becoming either eccentric or warped, which now frequently happens. These reinforce-strips in fact act as equalizers and distribute the strains resulting from the bent fibers, which all lie or trend in the same direction, and consequently produce distortion of the rim, which is thus rendered unfit for use.

What I claim is—

A laminated wheel-rim consisting of two or more strips of wood and an interposed strip or strips of vulcanized fiber, all solidly secured together, substantially as set forth.

In testimony whereof I affix my signature in presence of two witnesses.

ALFRED G. MOORE.

Witnesses:
ALFRED M. MOORE,
H. E. LODGE.